Sept. 2, 1952 T. E. BROOKS 2,609,208
PISTON AND CONNECTING ROD ALIGNER
Filed July 7, 1948 2 SHEETS—SHEET 1
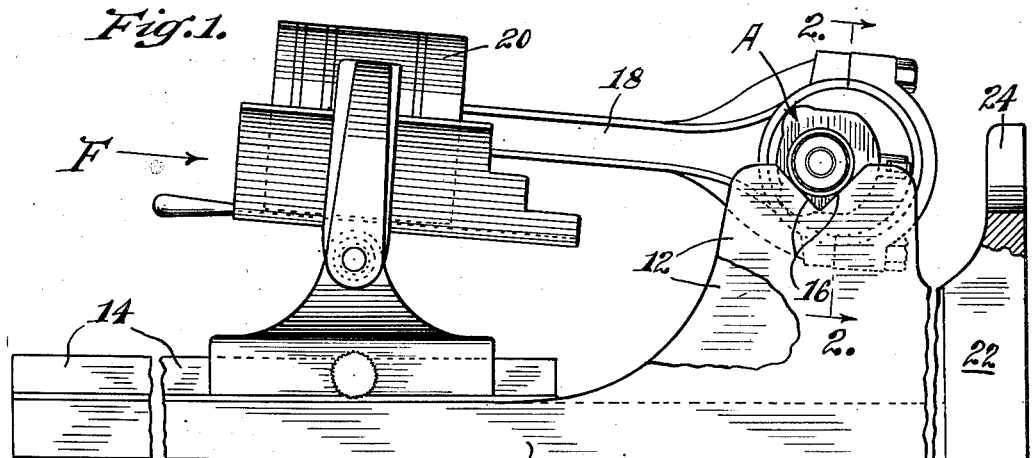
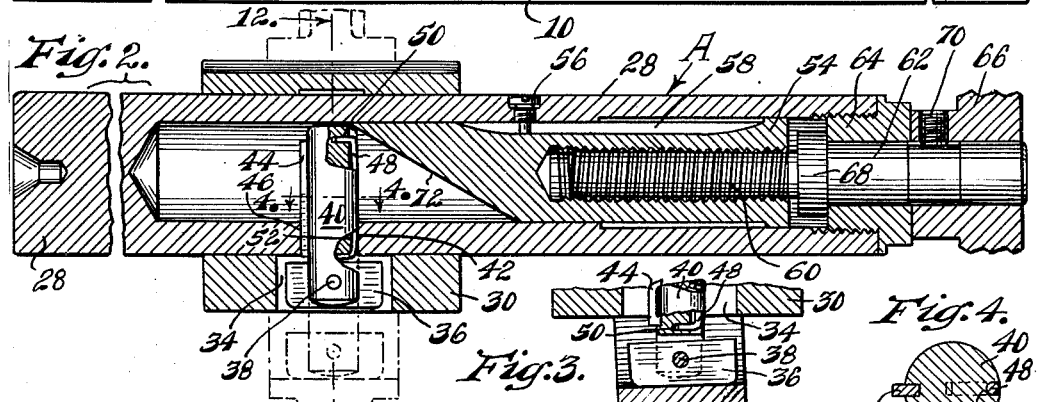
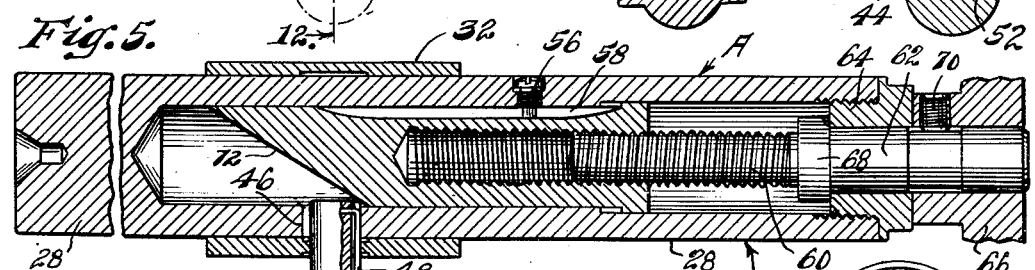
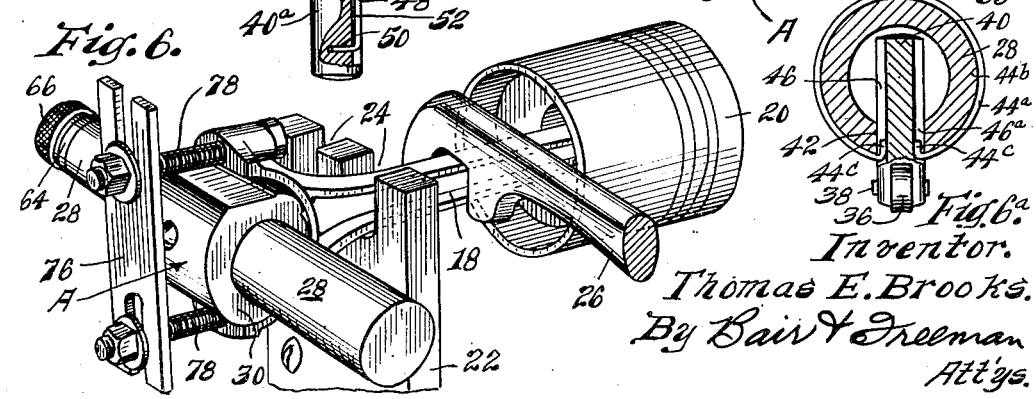
Inventor.
Thomas E. Brooks.
By Bair & Freeman
Att'ys.

Sept. 2, 1952  T. E. BROOKS  2,609,208
PISTON AND CONNECTING ROD ALIGNER
Filed July 7, 1948  2 SHEETS—SHEET 2
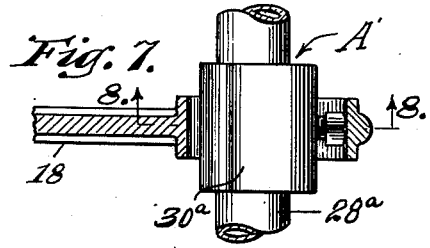
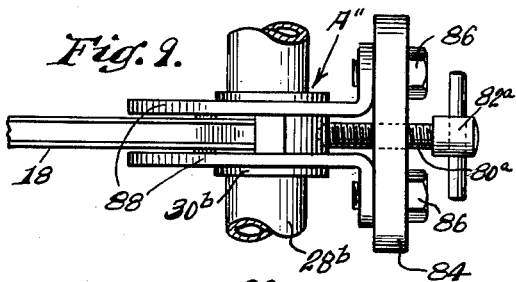
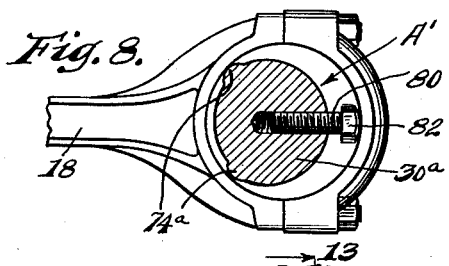
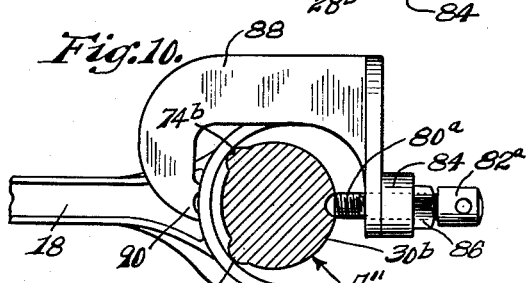
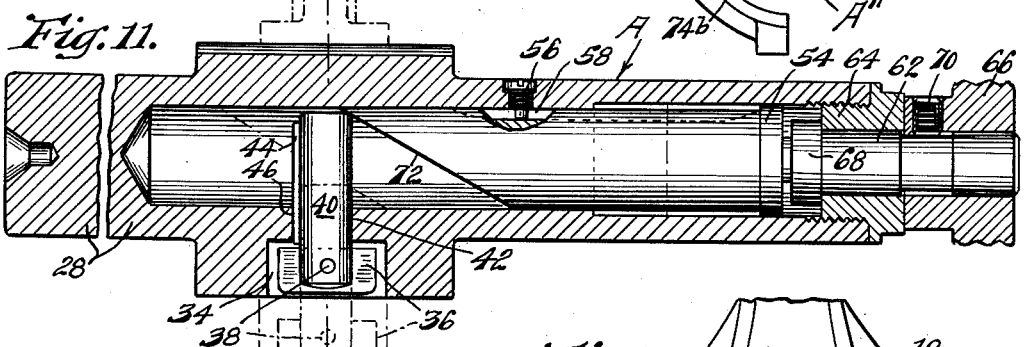
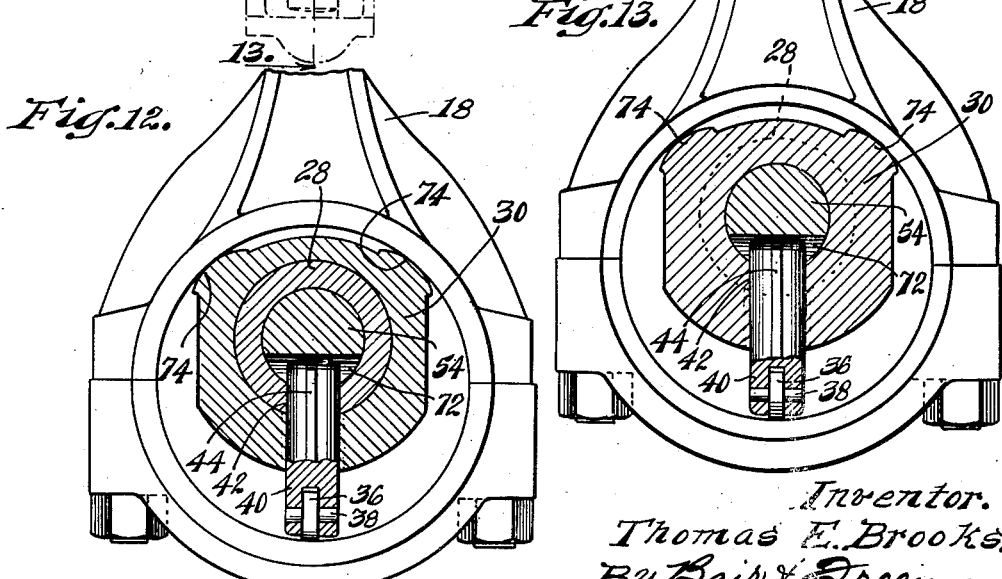
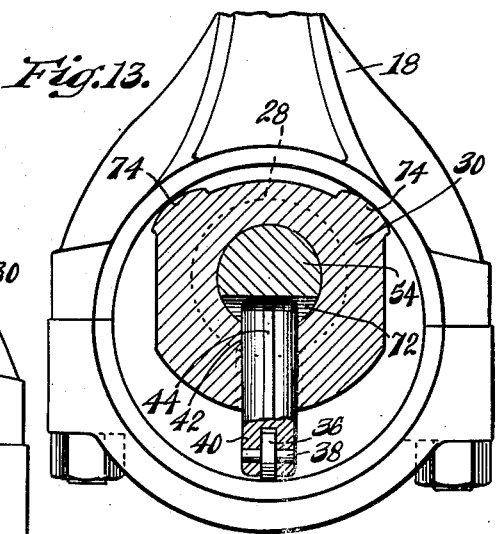
Inventor.
Thomas E. Brooks.
By Baird & Freeman
Attys.

Patented Sept. 2, 1952

2,609,208

UNITED STATES PATENT OFFICE 2,609,208

PISTON AND CONNECTING ROD ALIGNER

Thomas E. Brooks, Clarinda, Iowa, assignor to Lisle Corporation, Clarinda, Iowa, a corporation of Iowa Application July 7, 1948, Serial No. 37,484

5 Claims. (Cl. 279—2)

This invention relates to an aligner for pistons and connecting rods of the type shown in my assignee's Olson Patent No. 1,842,421, issued January 26, 1932, the present invention being in the nature of an improvement thereon particularly with respect to the arbor that is used in the connecting rod bearing and a means to provide for ready bending of the connecting rod to bring the piston into properly aligned position with respect to the connecting rod bearing.

One object of the invention is to provide the frame of the aligner with means to support an arbor in such manner that alignment can be checked yet the connecting rod and arbor can be readily removed as a unit from an open seat of the aligner frame to facilitate straightening of the connecting rod and return of the unit to recheck alignment in a minimum of time, thus effecting a saving in labor for the service man performing the aligning operation.

Another object is to provide an arbor of improved character having two-line contact with the connecting rod bearing and, opposite the two-line contact, having a third point or line of contact wherein a pivoted element provides line contact and due to its pivoting permits unrestricted seating of the two-line contact elements as well as the pivoted element with respect to the connecting rod bearing cap surface even if it is out of alignment with the opposing bearing surface in the connecting rod itself.

Still another object is to provide a notched member associated with the aligner to receive the connecting rod so that a bending tool can be applied to the connecting rod for readily bending or twisting it to the proper shape for aligning the parts, after which the alignment can be rechecked in a minimum of time.

A further object is to provide one type of arbor in which an adjusting knob may be rotated at the end of the arbor for adjusting its effective size.

Still a further object is to provide modifications of the arbor in which a set screw or C-clamp serve as a third point of contact opposite the two-line contact surfaces of the arbor.

An additional object is to provide means to support a connecting rod properly aligned on the arbor by engaging the connecting rod bearing with the two-line contact surfaces when the connecting rod cap is missing in the form of a clamp plate and clamp bolts, the plate providing a third line of contact opposite the two-line contact surfaces and loosely mounted on the bolts so as to seek full seating throughout all the lines of contact in an unrestricted manner.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of a piston and connecting rod aligner of the type shown in the Olson patent except as to open V-seats being illustrated for the arbor and an improved type of arbor being herein disclosed, the frame of the aligner having attached thereto a notched plate to receive the connecting rod when a bending tool is used to bend or straighten it.

Figure 2 is an enlarged sectional view of the arbor per se taken on the line 2—2 of Figure 1 and showing a connecting rod associated therewith in dot and dash lines.

Figure 3 is a sectional view of a portion of Figure 2 showing the action of a pivotal element when the connecting rod bearing cap is not aligned with the portion of the connecting rod bearing within the rod itself.

Figure 4 is a detail sectional view on the line 4—4 of Figure 2.

Figure 5 is a sectional view similar to Figure 2 showing a smaller sleeve and a shorter radially adjustable pin which omits the pivoted element of Figure 3, the parts being shown in a position for extending the pin as distinguished from a position for permitting the pin to assume its non-extended position in Figure 2.

Figure 6 is a perspective view of the arbor with clamp bolts and a clamp plate associated with the connecting rod when not using the cap in connection therewith, the bending operation for the rod being also illustrated in this figure.

Figure 6a is a sectional view showing a modification of Figures 2 and 5 such as might be taken on the line 12—12 of Figure 2.

Figure 7 is a sectional view through a connecting rod and a modified form of arbor.

Figure 8 is a sectional view on the line 8—8 of Figure 7.

Figure 9 is a plan view of another form of arbor utilizing a holding member in connection therewith similar to a C-clamp.

Figure 10 is an elevation looking upwardly at Figure 9.

Figure 11 is a partial sectional view of a modified construction similar to Figure 2 wherein a sleeve of Figure 2 is omitted and this part of the arbor is formed integral with the body of the arbor.

Figures 12 and 13 are sectional views on the line 12—12 of Figure 2 and 13—13 of Figure 11 showing the arbors of these prior figures rigidly mounted in connecting rod bearings.

On the accompanying drawings I have used the reference numeral 10 to indicate a base. The base has a pair of uprights 12 spaced from each other as clearly disclosed in the Olson patent. The base 10 has a trackway 14 thereon for an alignment checking fixture F. The fixture A is fully disclosed in the Olson patent and will not be described in detail in the present application inasmuch as it forms no part of my invention.

An open V-seat 16 is provided in the upper end of each upright 12. These seats are adapted to have an arbor A rest therein, the arbor being connected rigidly in the bearing of a connecting rod 18 and the piston 20 thereof coacting with the fixture F to check alignment as described in the Olson patent.

I have added to the frame of the aligner an element 22 having notches 24 to receive the connecting rod as shown in Figure 6 so that a bending tool 26 may be applied thereto for bending or twisting the connecting rod as found necessary to straighten it. The element 22 may be attached to a work bench or the like instead of to the aligner.

One form of the arbor A is shown in Figures 2, 3 and 4. It consists of a stud 28 having a sleeve 30 removably positioned thereon. In this manner the sleeve 30 may be removed and a smaller sleeve 32 substituted as in Figure 5 to adjust the arbor for a smaller range of connecting rod bearing sizes.

The sleeve 30 has an opening 34 to receive a blade 36 pivoted at 38 to a pin 40. The pin 40 is slidable in a radial hole 42 of the stud 28 and is prevented from rotating by means of a key 44 entering a keyway 46 of the hole 42. A spring wire for friction is shown at 48 having ends 50 received in holes bored into the pin 40 and the portion of the spring extending longitudinally of the pin is received in a keyway 52 of the pin.

In place of the keyway 46 and the key 44, Figure 6a illustrates a different arrangement to limit rotation of the pin 40 to a very few angular degrees and at the same time provide friction to prevent the pin from falling out of the opening 42, thus taking the place of the spring wire 48 in the groove 52. This modification consists of a spring ring 44a located in a groove 44b around the stud 28 and having inturned ends 44c which are normally closer together than the bottoms of grooves 46a in opposite sides of the pin 40. The single spring ring 44a thereby performs two functions replacing the parts 44 and 48 of Figures 2 and 5.

In Figure 2 the pin is shown at its inner limit of movement. It is desirable to move it radially for the purpose of engaging the connecting rod bearing and this is accomplished by means of a plunger 54 slidable in the stud 28 and non-rotatable in relation thereto by means of a key screw 56 entering a keyway 58 of the plunger.

The plunger 54 is internally screw threaded to receive a threaded end 60 of a shaft 62. The shaft 62 is rotatable in a bearing 64 and is provided with a knob 66 for rotating it. A thrust collar 68 is provided on the shaft 62 and engages against the inner end of the bearing 64. A set screw 70 serves to hold the knob 66 in position on the shaft 62.

The inner end of the plunger 54 is provided with a tapered plane surface 72 engageable with the inner end of the pin 40. The plunger 54 may be propelled toward the left by rotating the knob 66 clockwise which, due to the threads 60 being left hand, causes longitudinal movement of the plunger toward the left as to position of Figure 5. Obviously this propels the pin 40 or the similar pin 40a shown in Figure 5 outwardly.

When the sleeve 32 of less thickness is used there isn't room for the pivoted element 36 and accordingly the pin 40a is constructed without the pivoted element. The outer end of the pin 40a is rounded however to permit proper fitting in relation to a connecting rod bearing cap as will hereinafter appear.

Referring to Figure 12 it will be noted that the sleeve 30 is provided with two-line contact surfaces 74. The pivoted element 36 or the rounded outer end of the pin 40a serve as a third line or point of contact. In the event that there is no cap on the connecting rod 18 a clamp plate 76 may be provided as in Figure 6 connected with the connecting rod by clamp bolts 78. This still provides the two-line contact at 74 with the portion of the connecting rod bearing in the rod itself so that the bearing is properly aligned with the arbor and accurate alignment checking thereby being possible.

In Figures 7 and 8 I show a modified arbor in which the arbor itself is indicated at A'. The arbor A' has a stud portion 28a and an enlarged portion 30a corresponding to the sleeve 30. The portion 30a may be a sleeve or may be integral with the stud as illustrated in Figure 8.

In place of the pins 40 or 40a and the necessary mechanism to operate them, I provide in this form of arbor merely a set screw 80 having a head 82. The outer surface of the head is rounded to serve as a third point of contact opposite the two lines of contact indicated at 74a in Figure 8.

In Figures 9 and 10, a modification is shown which eliminates the need of the bearing cap. The arbor is indicated as A", its stud as 28b and its enlarged portion as 30b. Opposite the two lines of contact 74b, a set screw 80a is provided having an operating handle 82a. The set screw in this instance is screwed through a plate 84 having connected thereto by screws 86 a pair of hook-shaped plates 88. The plates 88 have ends 90 to engage the top of the connecting rod bearing as illustrated in Figure 10, the set screw 80a again operating in opposition to the two-line contact surfaces 74b.

In Figure 11 a further modification is shown which is similar in all respects except that in place of the removable sleeves 30 and 32 of Figures 2 and 5 an integral enlargement also indicated as 30 in Figure 11 is provided. Where only one range of adjustment is required this type of arbor can be used instead of interchangeable sleeve type.

*Practical operation*

In the operation of my piston and connecting rod aligner any form of the arbor may be fixed in the connecting rod bearing by engaging the two-line contact surfaces such as 74 with the rod part of the connecting rod bearing and the third element such as the pivoted blade 36 with the opposite portion of the bearing in the cap. With the arbor of Figure 5 the pin 40a is engaged with the cap while with the arbor of Figure 8 the set screw head 82 is engaged therewith.

In using the arbors of Figures 6 and 10 the plate 76 is engaged with the sleeve or enlargement 30 of the arbor or the set screw 80a is engaged with this enlargement respectively.

After the arbor is tightened in the bearing the connecting rod and arbor are a unit that can be handled for checking alignment quickly on the rod aligner. The arbor is seated in the open V-seats 16 and the piston 20 is engaged with the fixture F which fixture has indicating means for conveying to the operator information regarding whether the piston is aligned with the connecting rod or is out of alignment due to the connecting rod being bent or twisted.

If the parts are out of alignment the entire unit of connecting rod and arbor as shown in Figure 6 may be readily removed from the open V-seats 16 and associated with one of the notches 24 so that the bending tool 26 can be used for bending or twisting the connecting rod 18 as necessary. After the operator thinks he has given the connecting rod enough adjustment, he can quickly reseat the arbor in the seats 16 and recheck alignment, and then repeat the operations if the parts are still out of alignment.

It will be obvious from the foregoing specification that a number of constructions are possible for rigidly mounting the arbor with respect to the connecting rod with preferably two-line contact in each instance opposed by a third line of contact provided by a pivotal element or a third point of contact opposite the two lines. This provides for accurate alignment of the connecting rod bearing with the arbor and permits the arbor to fit bearing caps that are slightly out of alignment with assurance however that the two-line contact will be maintained with the connecting rod portion of the bearing, this being the most important surface in the operation of the engine from which the connecting rod has been removed.

By the connection of the arbor to the connecting rod the two can be handled as a unit and by the use of open seats at 16 the arbor can always be quickly aligned with the aligner by seating it in the seats, or as a matter of fact the aligner can be made with only one such seat for one end of the arbor if desirable. By providing open seats, after the alignment has been checked, the unit of arbor and connecting rod can be readily and quickly associated with the bending tool 26 and notches 24 as in Figure 6 and the unit just as quickly reseated with the arbor in the seats 16 for rechecking alignment. The open seats also permit free axial movement of the arbor to fit the piston to the fixture F. My arrangement therefore contributes to servicing the connecting rod in a minimum of time.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an arbor of the character disclosed, a stud having on its outer surface, and parallel to the axis of said stud, two line contact surfaces for contact with the inner surface of a bearing or the like, and a pin radially slidable in said stud and positioned opposite said two line contact surfaces for clamping said bearing against said line contact surfaces on said stud, and an elongated clamping element to provide a third line of contact, said clamping element being pivoted intermediate its ends in the outer end of said pin to allow the connecting rod bearing to locate unrestrictedly on said two line contact surfaces when said pin is moved radially outward relative to said arbor for contacting said clamping element with the connecting rod bearing.

2. In an arbor, a stud having on its outer surface, and parallel to the axis of said stud, at least two line contact surfaces for contact with the inner surface of a bearing or the like, and associated with said stud and positioned opposite said line contacts, pivotal clamping means for clamping said bearing against said line contact surfaces on said stud, said clamping means have a pivotal element to allow the connecting rod bearing to locate unrestrictedly on said line contact surfaces, and said clamping means being positively adjustable in a radial direction.

3. In an arbor of the character disclosed, a stud having on its outer surface, and parallel to the axis of said stud, at least two line contact surfaces for contact with the inner surface of a bearing or the like, and associated with said stud and positioned opposite said line contacts, pivotal clamping means for clamping said bearing against said line contact surfaces on said stud, said clamping means having a pivotal element to allow the connecting rod bearing to locate unrestrictedly on said line contact surfaces, said clamping means being adjustable in a radial direction, and said means being adjustable by screw threaded means.

4. In an adjustable arbor for piston and connecting rod aligners, a stud, a bushing thereon to engage the inner surface of a bearing or the like, and means for adjusting the effective size of said bushing comprising an axial bore and a radial hole in said stud, a pin slidable in said hole, a plunger slidably and non-rotatably mounted in said bore and having an inclined surface coacting with the inner end of said pin, and adjusting means coacting with a threaded bore of said plunger and rotatably and non-slidably mounted in relation to said stud for effecting axial movement of said plunger upon rotation of said screw threaded means.

5. In an arbor of the character disclosed, a stud having on its outer surface and parallel to the axis of the stud at least two axially elongated smooth surfaces each forming part of a cylinder of substantially less diameter than the internal diameter of a bearing or the like in which the arbor is to be mounted, whereby contact surfaces restricted to line contact with the inner surface of the bearing are had, and associated with said stud and positioned opposite said line contacts, a clamping means for firmly clamping the bearing against said line contact surfaces on said stud, said clamping means having at its outer end means so contacting the bearing surface as to allow the connecting rod bearing to locate unrestrictedly on said line contact surfaces, and said clamping means being restricted to slidable adjustment in a radial direction.

THOMAS E. BROOKS.

(References on following page)

References Cited

The following references are of record in the file of this patent:

UNITED STATES PATENTS

| Number | Name | Date |
|---|---|---|
| 1,074,280 | Miller | Sept. 30, 1913 |
| 1,432,121 | Prickett | Oct. 17, 1922 |
| 1,563,939 | Taylor | Dec. 1, 1925 |
| 1,568,583 | Anderson | Jan. 5, 1926 |
| 1,616,053 | Kylin | Feb. 1, 1927 |
| 1,651,546 | Reynolds | Dec. 6, 1927 |
| 1,805,475 | Anderson | May 19, 1931 |
| 1,842,421 | Olson | Jan. 26, 1932 |
| 1,910,174 | Miller et al. | May 23, 1933 |
| 2,013,373 | Zimmerman | Sept. 3, 1935 |
| 2,134,773 | Arp | Nov. 1, 1938 |
| 2,336,860 | Graham | Dec. 14, 1943 |
| 2,379,210 | Alyea | June 26, 1945 |

FOREIGN PATENTS

| Number | Country | Date |
|---|---|---|
| 405,408 | Great Britain | Feb. 8, 1934 |